United States Patent Office 3,507,664
Patented Apr. 21, 1970

3,507,664
MILK GEL COMPOSITION
Harry R. Schuppner, Jr., San Diego, Calif., assignor to Kelco Company, San Diego, Calif., a corporation of Delaware
No Drawing. Continuation of application Ser. No. 502,539, Oct. 22, 1965. This application Feb. 20, 1969, Ser. No. 801,174
Int. Cl. A23l 1/04
U.S. Cl. 99—139
19 Claims

ABSTRACT OF THE DISCLOSURE

A composition for forming a milk gel containing a finely divided relatively homogeneous mixture of a tetra-alkali metal pyrophosphate, an edible calcium salt, a Xanthomonas hydrophilic colloid and locust bean gum.

---

This application is a continuation of my copending application, Serial No. 502,539 filed Oct. 22, 1965 and now abandoned.

This invention relates to a gelled milk-base composition and a method for its preparation. More specifically, the invention is concerned with milk puddings and a process for making them which does not require the use of heat.

Milk puddings which contain a tetra-alkali metal pyrophosphate and an edible calcium salt are well known. See, for example, U.S. Patent No. 2,607,692 which discloses such a pudding. As an additional ingredient, milk puddings of the prior art usually require the presence of a dry pre-gelatinized starch. The milk gels produced from these compositions have a pasty or starchy consistency and are prone to exhibit objectionable liquid separation or syneresis on aging.

An object of this invention is to provide a pudding and a method for its production.

A further object of this invention is to provide a milk pudding which does not require the presence of starch and which has a relatively high stability or resistance to syneresis on aging.

Another object is to provide a pudding mix which is adapted to produce a pudding when added to milk.

My invention comprises a mixture of a tetraalkali metal pyrophosphate, an edible calcium salt, locust bean gum, and a Xanthomonas hydrophilic colloid.

The tetra-alkali metal pyrophosphate can be, for example, tetrasodium pyrophosphate, or tetrapotassium pyrophosphate. Examples of appropriate edible water-soluble calcium salts are calcium acetate, calcium lactate, calcium sulfate, calcium citrate, calcium gluconate, calcium propionate, calcium saccharate and calcium tartrate.

The Xanthomonas hydrophilic colloid which I employ may be illustrated by the Xanthomonas colloid produced by the bacterium *Xanthomonas campestris* which is a preferred Xanthomonas hydrophilic colloid for use in my invention.

The hydrophilic colloid material produced by the bacterium *Xanthomonas campestris* is a polymer containing mannose, glucose, potassium glucuronate and acetyl radicals. In such a colloid, the potassium portion can be replaced by several other cations without substantial change in the properties of the said material for my purpose. The said colloid, which is a high molecular weight, exocellular material, may be prepared by the bacterium *Xanthomonas campestris* by whole culture fermentation of a medium containing 2–5% commercial glucose, an organic nitrogen source, dipotassium hydrogen phosphate and appropriate trace elements. The incubation time is approximately 96 hours at 28° C., aerobic conditions. In preparing a Xanthomonas colloid as aforesaid, it is convenient to use corn steep liquor or distillers dry solubles as an organic nitrogen source. It is expedient to grow the culture in two intermediate stages prior to the final inoculation in order to encourage vigorous growth of the bacteria. These stages may be carried out in media having a pH of about 7. In a first stage a transfer from an agar slant to a dilute glucose broth may be made and the bacteria cultured for 24 hours under vigorous agitation and aeration at a temperature of about 30° C. The culture so produced may then be used to inoculate a higher glucose (3%) content broth of larger volume in a second intermediate stage. In this stage the reaction may be permitted to continue for 24 hours under the same conditions as the first stage. The culture so acclimated for use with glucose by the aforementioned first and second stages is then added to the final glucose medium. In the aforesaid method of preparing a *Xanthomonas campestris* hydrophilic colloid, a loopful of organism from the agar slant is adequate for the first stage comprising 200 milliliters of the said glucose media. In the second stage the material resulting from the first stage may be used together with 9 times its volume of a 3% glucose media. In the final stage the material produced in the second stage may be admixed with 19 times its volume of the final media. A good final media may contain 3% glucose, 0.5% distillers' dry solubles, 0.5% dipotassium phosphate, 0.1% magnesium sulphate having 7 molecules of water of crystallization and water. The reaction in the final stage may be satisfactorily carried out for 96 hours at 30° C. with vigorous agitation and aeration. The resulting *Xanthomonas campestris* colloidal material which I have found to be particularly suitable for my purpose can be recovered by precipitation in methanol of the clarified mixture from the fermentation. This resulting material may also be designated as a pseudoplastic, heteropolysaccharide hydrophilic colloid or gum produced by the bacterium species *Xanthomonas campestris*.

Additional Xanthomonas colloidal material may be prepared by repeating the procedure used for producing the *Xanthomonas campestris* colloidal material by substituting known Xanthomonas bacterium or organisms, i.e., *Xanthomonas carotae*, *Xanthomonas incanae*, *Xanthomonas begoniae*, and *Xanthomonas malvacearum*, for the bacterium *Xanthomonas campestris*.

The quantities of tetra-alkali metal pyrophosphate, edible calcium salt, Xanthomonas hydrophilic colloid and locust bean gum may be varied depending upon the particular properties desired in the milk pudding product. In general, however, I have found that a suitable preparation for use in my invention comprises from about 1.5 to about 3.5 parts of a tetra-alkali metal pyrophosphate, from about 1 to about 5 parts of an edible calcium salt, and from ½ to about 4 parts total of a mixture of a Xanthomonas hydrophilic colloid with locust bean gum. Preferably, the Xanthomonas hydrophilic colloid and locust bean gum are employed in about a 1 to 1 weight ratio. However, satisfactory results are obtained using other weight ratios, such as about 2 parts of Xanthomonas hydrophilic colloid to about 1 part of locust bean gum or about 2 parts of locust bean gum for about 1 part of Xanthomonas hydrophilic colloid. Preferably, both the Xanthomonas hydrophilic colloid and the locust bean gum are comminuted such that they will pass through a 100 mesh screen and that a major proportion will pass through a 200 mesh screen.

In forming a milk gel or milk pudding according to my invention, I add a homogeneous dry blend of my gelling composition, as defined above, to cold milk and blend in the ingredients with a mixer such as an egg beater or electric mixer. Following this, I pour the mixed material into a suitable container after which I preferably refrigerate the mixture. After approximately 15 minutes, the mixture has set sufficiently to eat.

The total quantity of gelling ingredients employed per unit volume of milk in forming a cold milk gel according to my invention can, of course, be varied depending upon the desired consistency of the gel. In general, I have found that a satisfactory gel results when using from about 1.5 to about 3.5 grams of a tetra-alkali metal pyrophosphate for each pint of cold milk. The concentration of the additional gelling ingredients, when expressed in gram quantities, would range from about 1 to about 5 grams of an edible calcium salt and from about ½ to about 4 grams total of a mixture of a Xanthomonas hydrophilic colloid with locust bean gum for each pint of cold milk.

In addition to the essential gelling components included in my composition, I can also include other ingredients which are normally used for flavoring and coloring of milk puddings. For example, I can include any of the usual flavorings such as cocoa, vanilla, cinnamon, and the like or fruit or nuts such as pecans, raisins, bananas, figs, dates, and the like. Moreover, I can include also an anti-foaming agent such as an edible oil, e.g., safflower oil, coconut oil, peanut oil, cottonseed oil, and the like.

In forming a milk pudding from my composition, I can employ either whole milk or liquid skim milk. Further, I can replace the milk altogether by adding dry milk solids, derived either from whole or skim milk, to my dry mix. In this case, the addition of water and agitation of the resulting mixture are all that is necessary for the preparation of a milk pudding.

In order to further illustrate my invention, there are presented the following examples in which all parts and percentages are by weight unless otherwise indicated.

EXAMPLE I

A mixture was formed by blending the following dry ingredients in the amounts indicated:

| | Gms. |
|---|---|
| Sugar | 80.00 |
| Cocoa | 15.00 |
| Vanilla flavor | 0.30 |
| Salt | 1.00 |
| *Xanthomonas campestris* hydrophilic colloid | 1.00 |
| Locust bean gum | 1.00 |
| Tetrasodium pyrophosphate | 2.50 |
| Calcium gluconate | 4.00 |

The above ingredients in a comminuted form were suitably mixed to give a homogeneous mixture and then added to one pint of cold milk and mixed for 3 minutes with an egg beater. The mixture was poured into a container which was refrigerated. After about 15 minutes, the mixture had set to form a milk pudding having a very smooth texture, a short body which breaks down readily to give a very clean mouth-feel, and stability to liquid separation or syneresis.

EXAMPLE II

A mixture of dry ingredients in finely comminuted form were blended to form a homogeneous dry mix in the following proportions:

| | Gms. |
|---|---|
| Sugar | 80.00 |
| Vanilla flavor | 0.40 |
| F.D. & C. Yellow #5 (the trisodium salt of 3-carboxy-5-hydroxy-1-p-sulfophenyl-4-p-sulfophenylazapyrazole) | 0.02 |
| F.D. & C. Yellow #6 (the disodium salt of 1-p-sulfophenylazo-2-naphthol-6-sulfonic acid) | 0.005 |
| Salt | 1.00 |
| *Xanthomonas campestris* hydrophilic colloid | 1.00 |
| Locust bean gum | 1.00 |
| Tetrasodium pyrophosphate | 2.50 |
| Calcium gluconate | 4.00 |

The above mixture was blended with one pint of milk for several minutes using an egg beater after which it was poured into a suitable container. The mixture was then refrigerated for about 15 minutes. At this point, the mixture had set sufficiently to eat. The resulting product had a very smooth texture, a short body which broke down readily to give a very clean mouth-feel, and stability toward syneresis.

When the above examples are repeated with the inclusion of the sugar and flavoring components during the mixing period, as opposed to adding them in the dry mix, satisfactory milk puddings are obtained. Moreover, when the above puddings are formed using artificial sweeteners such as saccharine in lieu of sugar, the puddings obtained have the smooth texture and stability toward syneresis that are characteristic of the puddings of my invention.

The above examples demonstrate my invention and the superior properties of the milk puddings produced thereby which have a smooth texture, a short body which breaks down readily to give a very clean mouth-feel, and a high resistance toward objectionable liquid separation or syneresis. As stated previously, one of the principal advantages of the puddings produced according to my invention is the fact that they do not require modification by the addition of gelling agents or thickeners such as instant starches. Thus, they do not have the pasty or starchy consistency which is characteristic of milk puddings of the prior art.

It should be understood, that my invention does not exclude the use of starches in milk puddings. The desirability of a particular pudding in terms of its consistency and taste is, of course, a subjective determination which depends ultimately upon the taste buds of the consumer. Thus, if a certain starchy flavor or consistency is desired, it is within the purview of my invention to include starch in whatever amount may be found desirable by the consumer.

My pudding compositions are especially desirable in that they can be formed in a cold milk having a temperature, for example, in the range of about 35° F. to about 45° F. In terms of additional time and trouble required to formulate a pudding composition in hot milk, this represents a substantial advantage to the busy housewife who may use my product.

Although my invention has been illustrated in terms of a milk pudding, it should be understood that my invention is applicable to the formation of any milk-base gel irrespective of whether it is used in a pudding or not. Thus, for example, my invention encompasses the formation of milk-based pie fillings of various flavors such as vanilla, chocolate, pecan, and the like.

Although I have described my invention with the aid of specific examples including the use of certain temperatures, proportions, ingredients, etc., I do not desire to limit my invention except within the lawful scope of the appended claims.

What is claimed is:

1. A composition suitable for forming a milk gel comprising a finely divided, relatively homogeneous mixture of a tetra-alkali metal pyrophosphate, an edible calcium salt, a Xanthomonas hydrophilic colloid and locust bean gum.

2. The composition of claim 1 wherein said tetra-alkali metal pyrophosphate is tetrasodium pyrophosphate.

3. The composition of claim 1 wherein said Xanthomonas hydrophilic colloid is produced by the bacterium *Xanthomonas campestris*.

4. A composition which is useful in gelling milk comprising from about 1.5 to about 3.5 parts of a tetra-alkali metal pyrophosphate, from about 1 to about 5 parts of an edible calcium salt, and from about ½ to about 4 parts of a mixture of a Xanthomonas hydrophilic colloid with locust bean gum.

5. The composition of claim 4 wherein said Xanthomonas hydrophilic colloid and said locust bean gum are employed in a weight ratio ranging from about 2 parts of Xanthomonas hydrophilic colloid to about 1 part of locust bean gum to about 2 parts of locust bean gum to about 1 part of Xanthomonas hydrophilic colloid.

6. The composition of claim 5 wherein said Xanthomonas hydrophilic colloid and said locust bean gum are employed in about a 1 to 1 weight ratio.

7. The composition of claim 5 wherein said Xanthomonas hydrophilic colloid and said locust bean gum are comminuted such that they will pass through a 100 mesh screen and that a major portion will pass through a 200 mesh screen.

8. The composition of claim 5 wherein said Xanthomonas hydrophilic colloid is produced by the bacterium *Xanthomonas campestris.*

9. A process for forming a cold milk gel comprising adding to cold milk a dry, finely divided composition containing a tetra-alkali metal pyrophosphate, an edible calcium salt, a Xanthomonas hydrophilic colloid, and locust bean gum, and agitating the milk composition to form a gel.

10. The process of claim 9 wherein the gelled milk composition is then refrigerated.

11. The process for forming a milk gel comprising adding to cold milk a composition containing from about 1.5 to about 3.5 parts of a tetra-alkali metal pyrophosphate, from about 1 to about 5 parts of an edible calcium salt, and about ½ to about 4 parts of a mixture of a Xanthomonas hydrophilic colloid with locust bean gum, and agitating the mixture to form a gel.

12. The method of claim 11 wherein said Xanthomonas hydrophilic colloid and said locust bean gum are employed in a weight ratio ranging from about 2 parts of Xanthomonas hydrophilic colloid to about 1 part of locust bean gum to about 2 parts of locust bean gum to about 1 part of Xanthomonas hydrophilic colloid.

13. The method of claim 11 wherein said Xanthomonas hydrophilic colloid and said locust bean gum are employed in about a 1 to 1 weight ratio.

14. The method of claim 13 wherein said Xanthomonas hydrophilic colloid and said locust bean gum are comminuted such that they will pass through a 100 mesh screen and that a major portion will pass through a 200 mesh screen.

15. The process of claim 11 wherein said gel is then refrigerated.

16. The process for forming a milk gel comprising adding to each pint of milk employed in the gel from about 1.5 to about 3.5 grams of a tetra-alkali metal pyrophosphate, from about 1 to about 5 grams of an adible calcium salt and from about ½ to about 4 grams of a mixture of a Xanthomonas hydrophilic colloid with locust bean gum, and agitating said mixture to form a gel.

17. A cold milk gel produced by adding a tetra-alkali metal pyrophosphate, an edible calcium salt, a Xanthomonas hydrophilic colloid and locust bean gum to cold milk, and agitating the mixture to form a gel.

18. A cold milk gel formed by adding to cold milk from about 1.5 to about 3.5 parts of a tetra-alkali metal pyrophosphate, from about 1 to about 5 parts of an edible calcium salt and from ½ to about 4 parts of a mixture of a Xanthomonas hydrophilic colloid with locust bean gum.

19. The composition of claim 18 wherein said Xanthomonas hydrophilic colloid of said locust bean gum are employed in a weight ratio ranging from about 2 parts of Xanthomonas hydrophilic colloid to about 1 part of locust bean gum to about 2 parts of locust bean gum to about 1 part of Xanthomonas hydrophilic colloid.

References Cited

UNITED STATES PATENTS

| | | | |
|---|---|---|---|
| 2,829,978 | 4/1958 | Castagna | 99—139 |
| 2,901,355 | 8/1959 | Bangert | 99—139 |
| 3,067,038 | 12/1962 | O'Connell | 99—144 X |
| 3,232,929 | 2/1966 | McNeeley | 195—31 X |

A. LOUIS MONACELL, Primary Examiner

J. M. HUNTER, Assistant Examiner

U.S. Cl. X.R.

99—131